United States Patent
Gartland et al.

(10) Patent No.: US 7,085,614 B1
(45) Date of Patent: Aug. 1, 2006

(54) METHOD, SYSTEM, AND COMPUTER PROGRAM PRODUCT FOR OPTIMIZING THROUGHPUT OF LOTS

(75) Inventors: Karl E. Gartland, Essex Junction, VT (US); Richard G. Burda, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/160,704

(22) Filed: Jul. 6, 2005

(51) Int. Cl.
*G06F 19/00* (2006.01)
(52) U.S. Cl. .................................................. 700/100
(58) Field of Classification Search ................ 700/100, 700/101, 102, 103, 121
See application file for complete search history.

(56) References Cited

U.S. PATENT DOCUMENTS

| | | | |
|---|---|---|---|
| 5,778,386 A | * | 7/1998 | Lin et al. ........................ 707/10 |
| 6,470,231 B1 | * | 10/2002 | Yang et al. ................... 700/121 |
| 6,784,003 B1 | | 8/2004 | Sun et al. ........................ 438/14 |
| 6,931,296 B1 | * | 8/2005 | Lin et al. ...................... 700/101 |
| 2004/0049398 A1 | | 3/2004 | Gartland et al. ................ 705/1 |

\* cited by examiner

*Primary Examiner*—Leo Picard
*Assistant Examiner*—Chad Rapp
(74) *Attorney, Agent, or Firm*—James J. Cioffi; Cantor Colburn LLP (57) ABSTRACT

A method, system, and computer program product for optimizing throughput of lots in a production facility is provided. The method includes assigning lot subtypes to lots in the production facility. One of the lot subtypes is a designator for distinguishing lots selected for expedited handling. When the lots enter a production queue, the method includes identifying a lot having the designator, the lot awaiting at least one process. In response to identifying the lot having the designator, the method includes sending an inhibit signal to a machine for preventing dispatch of a lot in the production queue that is next in line for the machine and which does not have the designator. In response to receiving a signal that the machine is available, the method includes sending a signal to the machine for binding the machine to the lot having the designator.

20 Claims, 4 Drawing Sheets

METHOD, SYSTEM, AND COMPUTER PROGRAM PRODUCT FOR OPTIMIZING THROUGHPUT OF LOTS

BACKGROUND OF THE INVENTION

The present invention relates generally to manufacturing execution systems and, more particularly, to a method, system, and computer program product for optimizing throughput of lots.

Computer information management (CIM) systems used in automated IC fabrication facilities (Fabs), such as a facility for processing 300 mm wafers, may include an automated manufacturing execution system (MES), an automated material handling system (AMHS), and an automated real time dispatcher (RTD). In such automated facilities, the basic goals are generally the same: to operate the overall facility with very high degree of efficiency, quality and flexibility, in order to maximize productivity and return-on-investment. Often times, this in turn requires optimizing product mix and output, while minimizing downtime.

While operating in full automation mode (i.e., with no human intervention), these systems produce output with great speed and efficiency. However, these fully automated operations are not without drawbacks. For example, when a production manager needs to stray from the prescribed manufacturing plan, e.g., if a lot requires expedited handling and needs to be processed out of turn ahead of other lots, this typically involves switching the production equipment operations from full automation mode to a manual operation mode, which requires human intervention. In many instances, this switch to manual mode of operation results in disruption and a slow down in production. One solution has been to assign or designate specific equipment for expedited lots (also referred to as 'rapid turn around time' (RTAT) lots, 'quick turn around time' (QTAT) lots, or 'hot lots'). However, this solution often results in unnecessary machine down time when there are no expedited lots ready for dispatch.

What is needed, therefore, is a way to optimize the throughput of lots designated for expedited handling in a fully automated production line without switching the equipment out of full automation mode.

SUMMARY OF THE INVENTION

The foregoing discussed drawbacks and deficiencies of the prior art are overcome or alleviated by a method, system, and storage medium for optimizing throughput of lots in a production facility. The method includes assigning lot subtypes to lots in the production facility. One of the lot subtypes is a designator for distinguishing lots selected for expedited handling. When the lots enter a production queue, the method includes identifying a lot having the designator, the lot awaiting a process. In response to identifying the lot having the designator, the method includes sending an inhibit signal to a machine for preventing dispatch of a lot in the production queue that is next in line for the machine and which does not have the designator. In response to receiving a signal that the machine is available, the method includes sending a signal to the machine for binding the machine to the lot having the designator.

The system for optimizing throughput of lots in a production facility includes a production machine and a host system in communication with the production machine. The host system executes a manufacturing execution system and a lot optimization application. The lot optimization application includes a user interface for assigning lot subtypes to lots in the production facility. One of the lot subtypes is a designator for distinguishing lots selected for expedited handling. Upon entering a production queue, the lot optimization application identifies a lot having the designator. The lot is awaiting a process by the machine. In response to identifying the lot having the designator, the lot optimization application sends an inhibit signal to the machine for preventing dispatch of a lot in the production queue that is next in line for the machine and which does not have the designator. In response to receiving a signal that the machine is available, the lot optimization application sends a signal to the machine for binding the machine to the lot having the designator.

A computer program product for optimizing throughput of lots in a production facility includes instructions for performing a method. The method includes assigning lot subtypes to lots in the production facility. One of the lot subtypes is a designator for distinguishing lots selected for expedited handling. When the lots enter a production queue, the method includes identifying a lot having the designator, the lot awaiting at least one process. In response to identifying the lot having the designator, the method includes sending an inhibit signal to the machine for preventing dispatch of a lot in the production queue that is next in line for the machine and which does not have the designator. In response to receiving a signal that the machine is available, the method includes sending a signal to the machine for binding the machine to the lot having the designator.

BRIEF DESCRIPTION OF THE DRAWINGS

Referring to the exemplary drawings wherein like elements are numbered alike in the several FIGURES.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION OF THE INVENTION

Disclosed herein are a method, system, and storage medium for optimizing throughput of lots in accordance with exemplary embodiments. The lot optimization activities of the invention are particularly well suited for lots determined to require expedited handling such as rapid turnaround time (RTAT) lots. In a typical manufacturing facility, production planning personnel generate a manufacturing plan that details the manner in which lots will be processed in accordance with available resources, commit dates, and other criteria. Between the time that the manufacturing plan is created and at the time of execution, there may be circumstances that occur which warrant changes to the manufacturing plan (e.g., unforeseen demand for a product in the marketplace). As indicated above, these changes can create difficulties in a fully automated production line where equipment is switched in and out of auto mode.

The lot optimization activities of the invention enable such lots to be processed out of sequence while maintaining the equipment in full automation mode. The lot optimization system utilizes an inhibitor signal, a rules-based engine, and a lot subtype designator for facilitating the optimization activities described herein. The lot subtype is configured to manage lots designated for expedited handling (also referred to herein as rapid lots); however, it will be understood that the optimization activities may be implemented for any type of lot that requires special handling.

Figure 1:
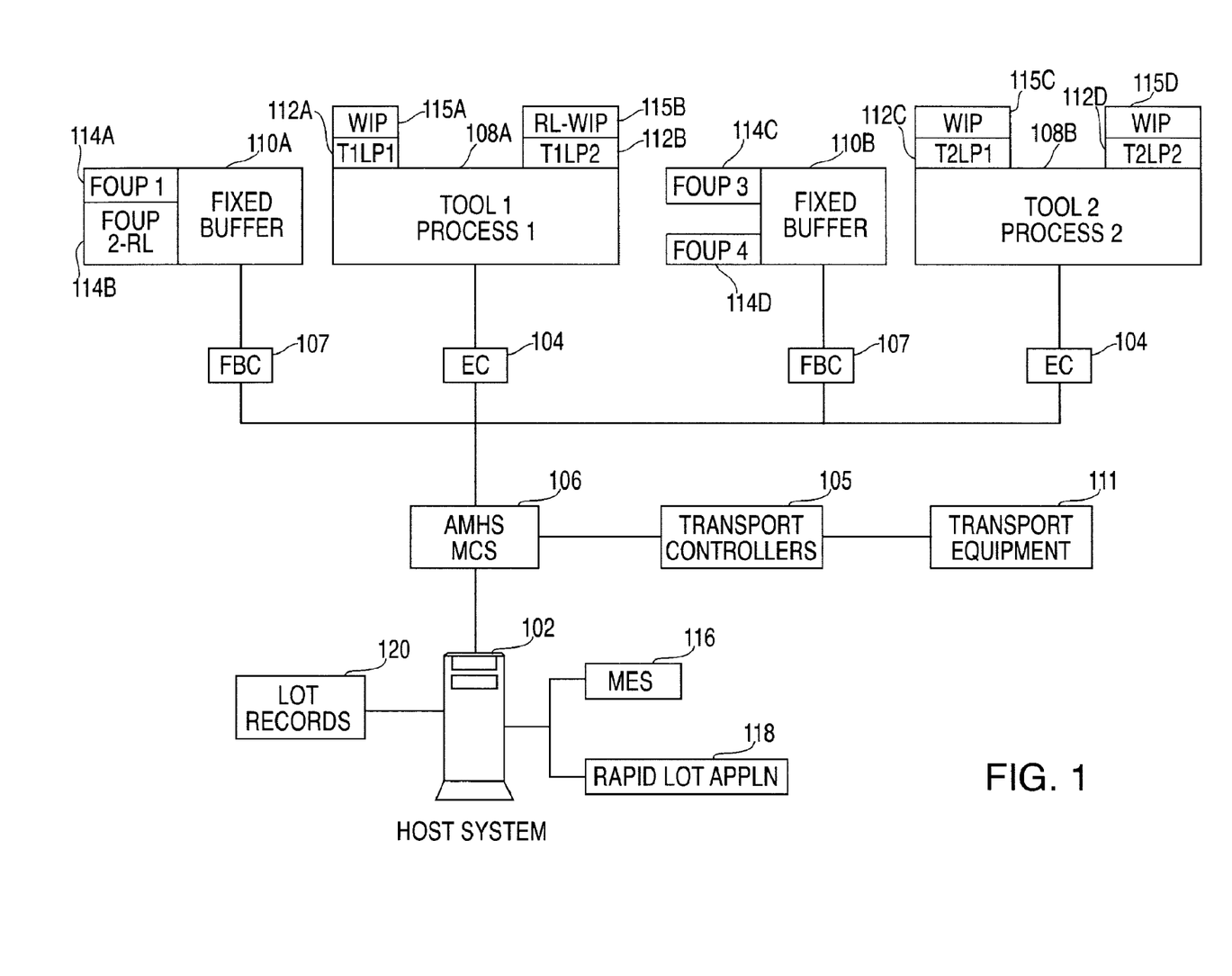
FIG. 1 is a system upon which optimization of lot throughput activities may be implemented in exemplary embodiments.

Turning now to FIG. 1, an exemplary system for optimizing throughput of lots will now be described. For purposes of illustration, the system of FIG. 1 represents a fully automated semiconductor fabrication facility. However, it will be understood that the processes described herein may be employed in other environments as well, e.g., any automated facilities operating industrial equipment.

The system of FIG. 1 includes a host system 102 in communication with an automated material handling system (AMHS) 106 via any suitable communications technologies (including wireline and wireless). Host system 102 may comprise a high-speed processor for handling the volume of production activities typically found in a manufacturing facility. For example, in an automated IC fabrication facility (Fab), such as a facility for processing 300 mm wafers, the host system 102 may execute an automated manufacturing execution system (MES) 116, such as IBM's® ITS SiView Standard MES.

Host system 102 may also execute other applications, such as a real time dispatcher (RTD) application. The RTD includes programmable logic that tells the MES which lots to process for every tool in the production area, based on, e.g., schedules, priorities, commit dates, etc. The RTD or dispatcher may be built in as part of the MES, may be a separate component of the MES, such as the SiView Scheduler, or it could be a third party application.

The lot optimization activities may be implemented by one or more applications executing on host system 102. These one or more applications are collectively referred to as rapid lot application 118. The rapid lot application 118 enables a production manager/team to identify and process lots designated for expedited handling without switching the production equipment out of full automation mode (e.g., in the SiView Standard MES, this mode is sometimes called "Full Auto3 Mode"). The rapid lot application 118 utilizes a lot subtype designator, an inhibit signal of the MES 116, a machine state relating to the production equipment (e.g., available and unavailable states in accordance with the SEMI E10 standard), and a rules-based engine as will be described further herein.

Also shown in the system of FIG. 1 are lot records 120. Lot records 120 may be stored in memory contained within host system 102, or may be stored in a separate physical storage device that is logically addressable by the host system 102. Lot records 120 provide specific information relating to each of the lots handled in the facility of FIG. 1 and are described further in FIG. 2.

AMHS 106 manages the transport of materials (lots) within a production area. A material control system (MCS) application, such as Murata's Automated Control System by Murata Machinery, Ltd™, may also be implemented for receiving operations and scheduling information for materials to be processed on production equipment via, e.g., host system 102.

The AMHS 106 is in communication with production equipment 108A and 108B, which are located in an area of the facility referred to as a production area. Production equipment 108A and 108B refer to fixed buffer equipment; that is, equipment 108A–108B have fixed loadports for receiving materials from front-opening unified pods (FOUPs) rather than from internal buffer storage. When materials are ready to be processed, they are loaded and unloaded directly from the FOUP at the loadport. The FOUPs are temporarily stored at a fixed buffer location (e.g., fixed buffers 110A–110B). Fixed buffers 110A–110B refer to buffer storage elements (e.g., fixed stockers) that are local to a given piece of equipment such as production equipment 108A and 108B. These fixed buffers 110A–110B are particularly useful for production equipment that does not include internal buffer storage. Fixed buffers 110A–110B provide storage for materials that are awaiting processing by production equipment 108A and 108B, respectively, and communicate with the AMHS 106 via fixed buffer controllers 107.

Production equipment 108A and 108B include tools that perform processing on materials in accordance with a manufacturing plan. Production equipment 108A and 108B may include computers and/or microprocessor-based controllers (equipment controllers or ECs 104), which control the internal operation of the equipment 108A–108B and most, if not all, exchanges of information with other elements of the facility (e.g., AMHS 106 and transport/stocker equipment). Production equipment 108A and 108B receive controller commands over suitable communication paths (e.g., wireline or wireless means), which in turn provide various responses. These communication paths may utilize the same or separate physical wires, coaxial cables, optical cables, radio frequency links, etc. While only a single production area is shown, it will be understood that multiple production areas may be managed by host system 102 in terms of implementing the lot optimization activities of the invention.

As shown in the system of FIG. 1, tools 108A and 108B each include two loadports 112A–112B and 112C–112D, respectively. Loadports 112A–112D enable material carrier delivery to the production equipment 108A–108B. For example, in a semiconductor manufacturing environment, loadports 112A–112D may be used to receive FOUPs, wafer carriers, frame carriers, and other similar items. In exemplary embodiments, loadports 112A–112D are SEMI-compliant (i.e., conform to standards set forth by Semiconductor Equipment and Materials International (SEMI), an organization with established goals to further industry improvement by bringing industry persons together to solve common technical issues).

FOUPs 114A–114D store materials (e.g., 300 mm wafers) that are awaiting processing and/or transport. As shown in FIG. 1, FOUP 114B has been flagged for expedited handling as will be described further herein. Additionally, as shown in FIG. 1, works-in-process (WIPs) 115A–115B and 115C–15D are currently engaged at loadports 112A–112D, respectively, with respect to tools 108A and 108B. WIP 115B has been flagged for expedited handling as well. Each of tools 108A and 108B perform one or more processes on materials in accordance with a manufacturing plan. WIP materials refer to those materials that are currently undergoing a machine process or en route between tools or production areas. Materials that are used in manufacturing may include substances, component parts, assemblies, and other items typically found in a manufacturing environment.

These process materials (i.e., lots) may be assigned to various production areas, some of which materials may be ready for processing within minutes and others that may be waiting for hours or days. In an automated facility, these lots are moved around (e.g., from equipment to equipment, from equipment to storage, from storage to equipment, etc.) in accordance with a specified manufacturing plan or route, via transport equipment 111. Transport equipment may include mechanized ground vehicles such as an automated guided vehicle (AGV) or personal guided vehicle (PGV), or may include an overhead transport (OHT) device supported by a monorail that transfers WIP materials (e.g., lots 114D–114F) between equipment and/or production areas. The movement of transport equipment 111 is typically prompted via signals received from AMHS 106 via transport controllers 105. For example, the materials in FOUPs 114A–114B are stored in fixed buffer 110A and materials in FOUPs 114C–114D are stored in fixed buffer 110B. The materials in FOUP 114A are assigned to a job (e.g., next-in-line in processing) awaiting production equipment 108A with FOUP 114B following FOUP 114A. When production equipment 108A becomes available, AMHS 106 signals transport equipment 111 via transport controllers 105 to pick up FOUP 114A from fixed buffer 110A and deliver it to an available loadport on production equipment 108A.

The manufacturing execution system 116 ensures that lots are processed in accordance with a manufacturing plan that specifies the nature of the processing to be performed, which tools are required, the sequence in which process steps are to be performed, and where a lot will be redirected after completion of each process step. The MES 116 maintains a production queue that tracks lots waiting for processing at a production machine or waiting for transport between production equipment/areas. Some or all of this information may be stored in memory at the host system 102 in any suitable form desired by the manufacturing facility. For purposes of illustration, this information is stored in individual lots records 120 as shown and described in FIG. 2.

As indicated above, a manufacturing plan may require modification due to, e.g., unforeseen circumstances. The rapid lot application 118 includes a user interface that enables production team members to modify the execution of a manufacturing plan without switching the production equipment out of full automation mode using a lot subtype designator. The lot optimization activities further utilize an inhibitor signal of the MES 116, production equipment machine states, and a rules-based engine.

Figure 2:
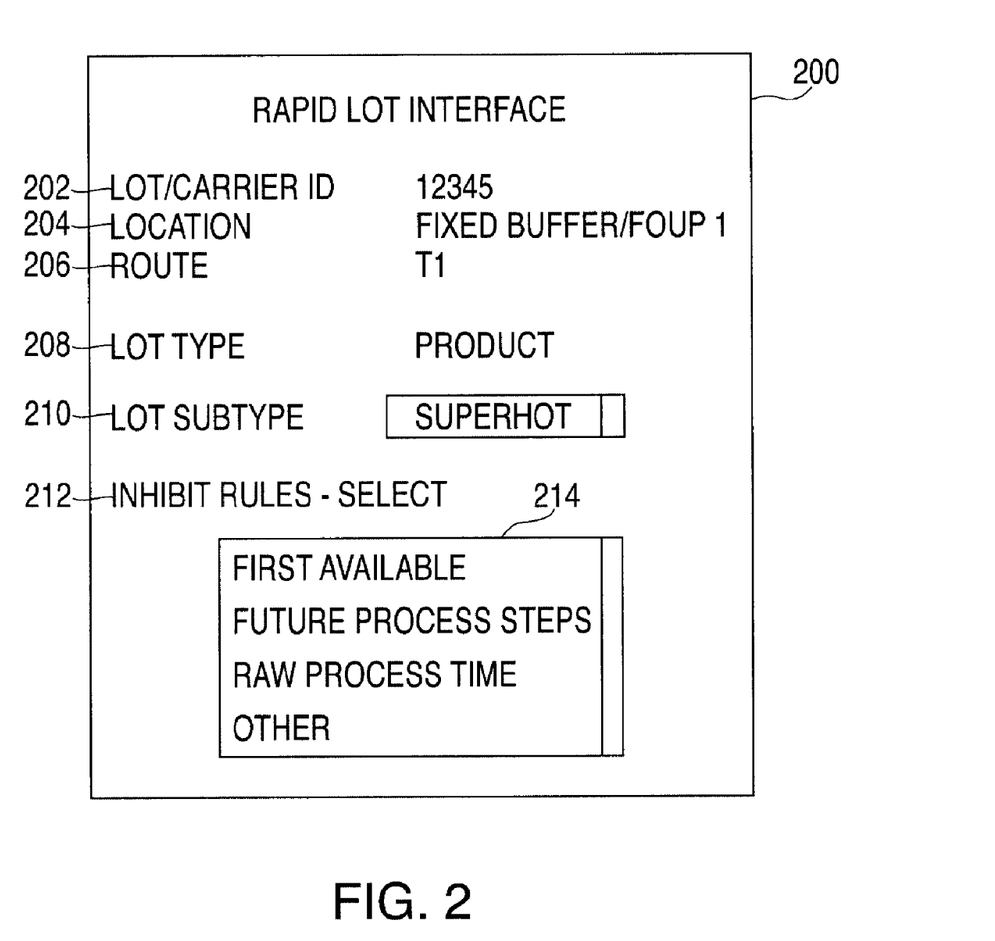
FIG. 2 is a user interface screen depicting data fields and sample data associated with a lot record usable in implementing optimization of lot throughput activities in exemplary embodiments.

Turning now to FIG. 2, a user interface screen depicting data fields and sample data associated with a lot record and usable in implementing optimization of lot throughput activities will now be described in accordance with exemplary embodiments. An individual may access the rapid lot application 118 via, e.g., host system 102, whereby a user interface is presented to the individual as shown in FIG. 2. The user interface screen 200 of FIG. 2 illustrates a sample lot record that provides general information concerning a lot, such as a lot identifier 202, a current location of the lot 204, and a designated route 206 that the lot will take in the course of manufacture (e.g., processes to be undertaken, tools assigned, and a sequence of events, such as looping back to a previous tool). The current location of the lot may be acquired by any suitable means, such as RFID technology (e.g., a reader that scans an RFID tag on a carrier), infrared (IR), bar code technology, etc., and transmits the information back to the host system 102.

The rapid lot application 118 provides a means for identifying a lot for expedited handling based upon certain criteria via the user interface screen 200. The lot type field 208 and lot subtype field 210 may be used to provide this designation. A lot subtype referred to as SUPERHOT provides this facility. Once designated a SUPERHOT lot, an individual may further specify additional processing rules for application to the lot via the rules-based engine (also referred to as inhibitor rules). These inhibitor rule selections may be implemented via a subwindow 214 provided on the user interface screen 200. Options include FIRST AVAILABLE, FUTURE PROCESSING STEPS, RAW PROCESS TIME, and OTHER. The option, FIRST AVAILABLE, enables a lot designated for expedited handling to be given priority treatment throughout its route (i.e., for every step in the manufacturing plan, the lot will be processed by the next available equipment until the lot has completed its route). The next option, FUTURE PROCESSING STEPS, enables a lot to be given priority treatment as described above with respect to the FIRST AVAILABLE option, but the priority treatment applies only to a given number of future processing steps in the course of the route. The next option, RAW PROCESSING TIME, enables a lot to be given priority treatment for selected processing steps that meet a time criteria. For example, a plan calls for a lot to undergo five processing steps. Steps 2 and 5 consume 30 minutes each and steps 1, 3, and 4 are each under three minutes long. The RAW PROCESSING TIME option enables an individual to identify and select certain steps in the course of the lot's route that will be given priority treatment. The option, OTHER, enables a production team member to customize his/her own rules for giving priority treatment to a lot. The rapid lot application 118 ensures that the lot designated for expedited handling will be given priority treatment in accordance with the selected inhibitor rules.

In exemplary embodiments, the rapid lot application 118 uses route/tool information to determine which tools need to be inhibited at which time to allow for unblocked flow of rapid lots without unnecessary tool inhibit time. The rapid lot application 118 may inhibit tools on or more steps down the route when necessary to clear the downstream tool in time for the predicted arrival of rapid lots. The rapid lot application 118 may periodically check that the tools currently inhibited in anticipation of the arrival of a rapid lot are available to run the designated rapid lot. If the designated tool is no longer available to run the rapid lot due to tool/chamber down conditions or other contingencies, then the rapid lot application 118 may choose an alternate tool to run the lot and impose the requisite inhibits on the newly selected tool.

Figure 3:
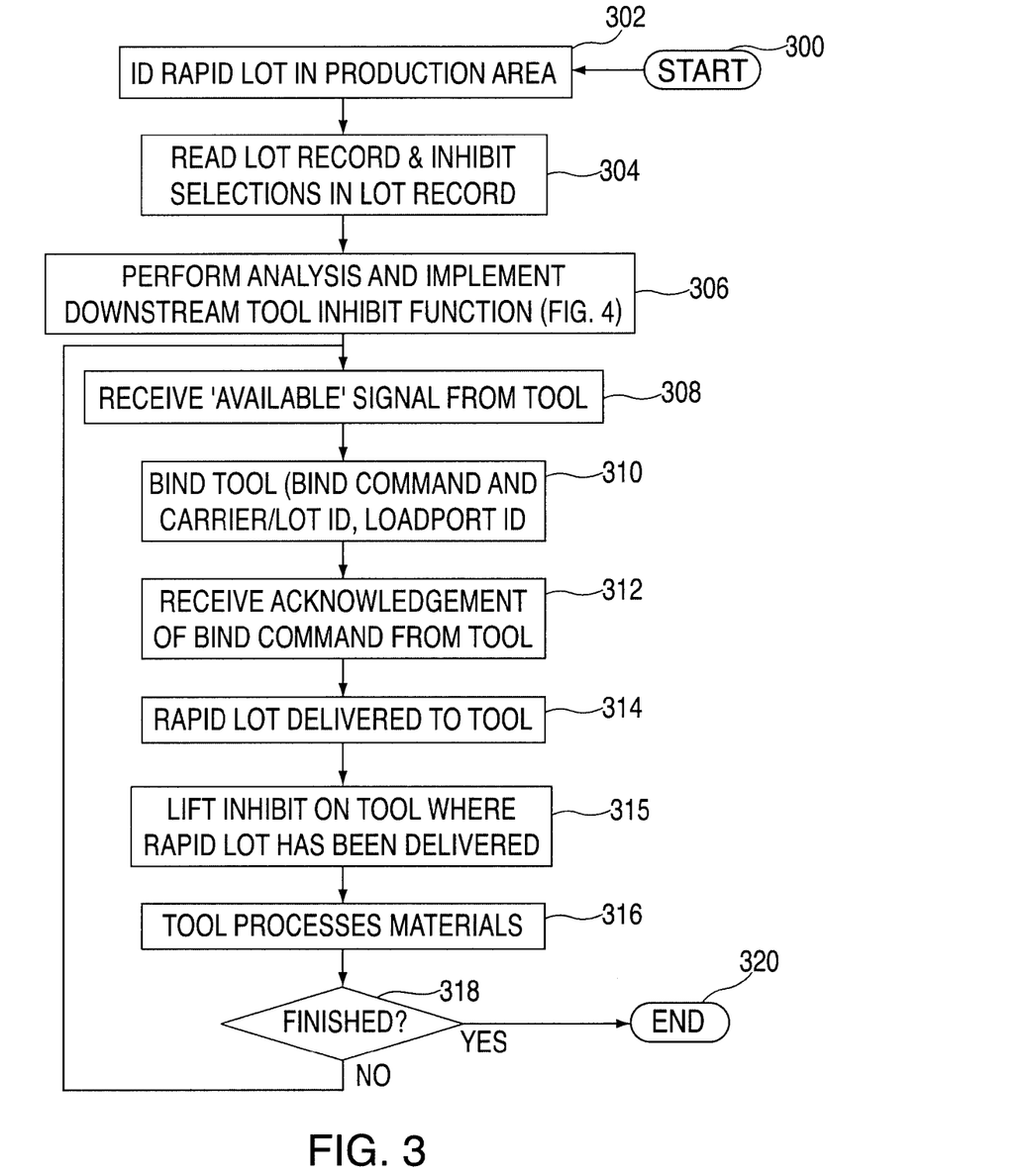
FIG. 3 is a flow diagram describing a process for implementing the optimization of lot throughput activities in exemplary embodiments.

Turning now to FIG. 3, an exemplary flow diagram describing a process for optimizing throughput of lots will now be described. The process begins at step 300. A lot designated for expedited handling (i.e., rapid lot) enters a production area at step 302. The lot may be identified by the MES 116 as a rapid lot via the subtype lot designator SUPERHOT as described above in FIG. 2. For example, FOUP 114B of FIG. 1 is stored in fixed buffer 110A and is awaiting processing by production equipment 108A. As shown in FIG. 1, FOUP 114B is currently in the production queue as next in line following FOUP 114A. The MES 116 reads the lot record and any applicable inhibit rule selections at step 304. The rapid lot application 118 performs downstream inhibit analysis and functions at step 306. In an exemplary embodiment, the analysis and inhibit functions may be recursively implemented as described in FIG. 4. The analysis and inhibit functions performed at step 306 (and described further in FIG. 4) result in the MES 116 sending an inhibit signal to the appropriate production equipment (i.e., equipment 108A) via EC 104. The inhibit signal causes the production equipment to refrain from accepting any lot that is currently assigned to and waiting for the equipment. Accordingly, FOUP 114A, though next in line, will be prevented from being delivered to equipment 108A. However, any WIPs currently engaged with the production equipment (e.g., WIPs 115A and 115B) are exempt from the inhibit signal and are processed according to the plan. Once the production equipment has completed a WIP, it sends an available signal to the host system 102, which is received at the MES 116 at step 308.

In response to this signal received at step 308, the MES 116 sends a signal to the production equipment binding it to the rapid lot (i.e., the lot in FOUP 114B) at step 310. The bind signal may include lot information such as carrier ID, lot ID, loadport ID of the available loadport, recipe, etc. The production equipment (equipment 108A) sends a signal acknowledging the bind signal, which is received at the MES 116 at step 312. In response to the acknowledgement signal, the MES 116 sends a signal to the AMHS 106 to deliver the rapid lot to the equipment at step 314. Once the lot has been delivered, the bind signal is discontinued, and the inhibit is lifted, so that the production equipment may accept future lots according to the existing plan at step 315.

The rapid lot is processed by the equipment at step 316. Once the processing has completed, it is determined whether the rapid lot has completed its expedited handling at step 318. For example, it may be that the processing of the rapid lot has completed or that the expedited handling of the rapid lot has completed. If so, the process ends at step 320. If the expedited handling of the rapid lot has completed, but not the processing in general, the rapid lot may continue on through the production facility in accordance with the original manufacturing plan; that is, without expedited handling.

If on the other hand, the expedited handling of the lot has not completed at step 318, the system awaits the next available signal from the tool inhibited to perform the next process step on the rapid lot, and the process returns to step 308. For example, if the inhibit rule selection specifies FUTURE PROCESSING STEPS, the MES 116 looks to make the rapid lot reservation on the next production equipment 108B indicated in the lot record's route (e.g., production equipment 108B). The process continues as described above.

Figure 4:
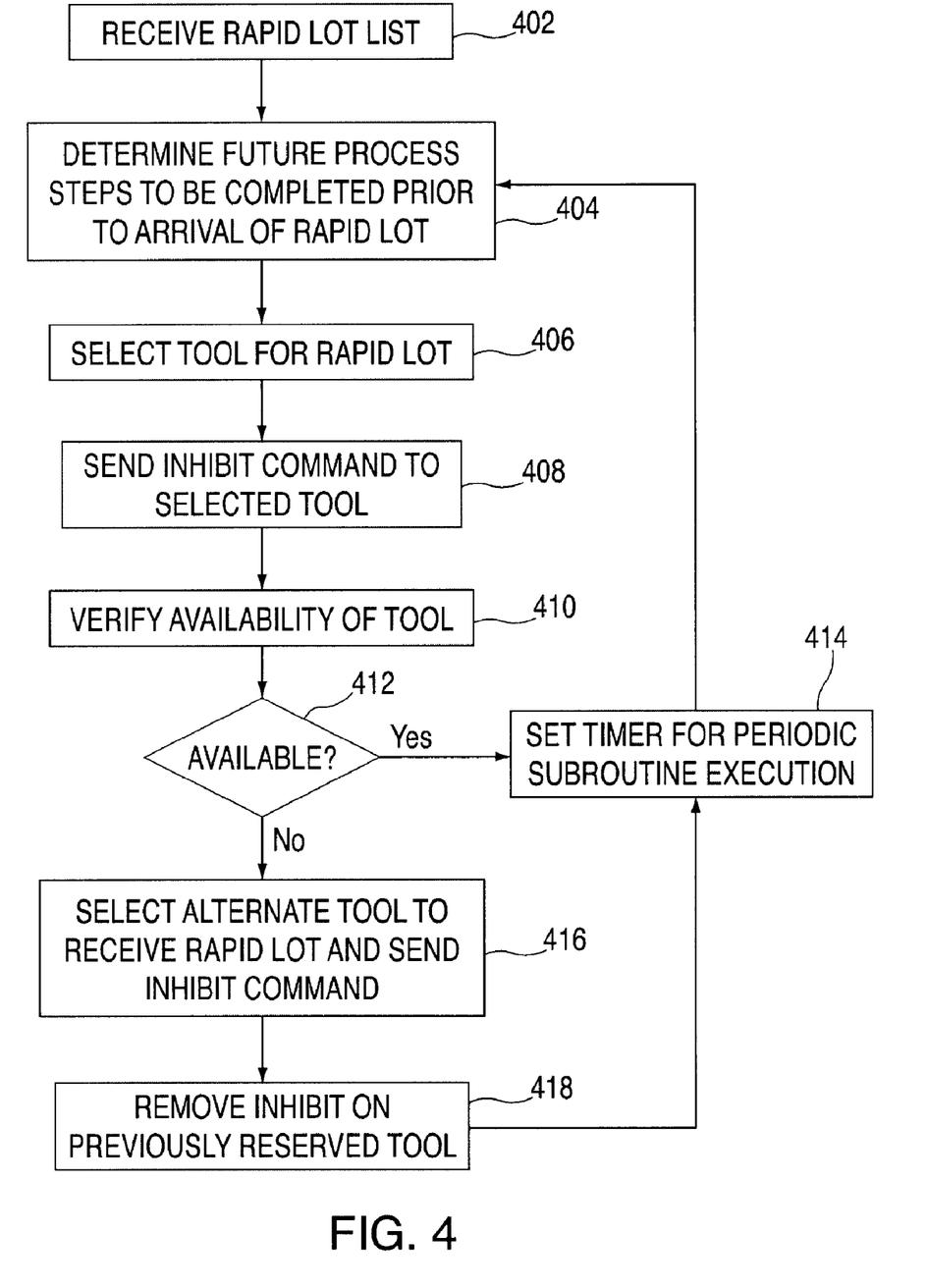
FIG. 4 is a flow diagram describing a process for performing downstream inhibit analysis and functions usable in implementing the optimization of lot throughput activities in exemplary embodiments.

Turning now to FIG. 4, an exemplary process for performing inhibit analysis and downstream functions (step 306 of FIG. 3) will now be described. As indicated above, these analysis and downstream functions may be implemented recursively throughout the optimization process. At step 402, the rapid lot application 118 receives a rapid lot list via the user interface. The rapid lot application 118 includes logic for examining the rapid lots in the production facility, including their current operations and production tool/timing possibilities, and determining which future processing steps need to be completed prior to the arrival of the rapid lots. This analysis is performed at step 404. The production tool/timing possibilities may be used to estimate when a rapid lot should arrive at a future operation. They may also be used to determine when a future tool should be inhibited based upon the estimated arrival time of the rapid lot factoring in any remaining processing time for existing WIPs.

Based upon this analysis, an appropriate tool is selected for the rapid lot at step 406. For example, suppose rapid lot's 114B expected arrival time at production equipment 108B is 20 minutes, and it is determined that WIP 115C has 30 minutes left before it finishes up on tool 112C. Suppose also that WIP 115D has 40 minutes left on tool 112D. Rapid lot 114B has priority over lots 114C and 114D, which are not rapid lots. Accordingly, tool 112C may be selected for the rapid lot 114B since it will be available (notwithstanding lots 114C and 114D) before tool 112D. Note that this analysis is performed for downstream tools (i.e., rapid lot 114B is still awaiting processing at production equipment 108A). The MES 116 sends an inhibit command to the selected tool at step 408. While the rapid lot is awaiting processing (or alternatively, while the rapid lot is being processed at a tool earlier in the production process), the rapid lot application 118 continues to verify the availability of the inhibited tool at step 410.

At step 412, it is determined whether the inhibited tool is still available to accept the rapid lot (e.g., the tool has not been disabled). If so, the rapid lot application 118 logic sets a timer for ongoing periodic verifications of the availability of the inhibited tool at step 414, and the process returns to step 404. Otherwise, an alternative tool is selected to be inhibited and the MES 116 sends an inhibit command to the alternative tool at step 416. The inhibit command previously sent to the originally selected tool is removed at step 418 in order to allow the originally selected machine to accept other lots, and the process returns to step 414.

The lot optimization activities of the invention enable such lots to be processed out of sequence while maintaining the equipment in full automation mode. The lot optimization system utilizes an inhibitor signal, a rules-based engine, and a lot subtype designator for facilitating the optimization activities described herein. The lot subtype is configured to manage lots designated for expedited handling. The lot optimization activities of the invention enable such lots to be processed out of sequence while maintaining the equipment in full automation mode. The lot optimization system utilizes an inhibitor signal, a rules-based engine, and a lot subtype designator for facilitating the optimization activities described herein. The lot subtype is configured to manage lots designated for expedited handling (also referred to herein as rapid lots); however, it will be understood that the optimization activities may be implemented for any type of lot that requires special handling.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for optimizing throughput of lots in a production facility, comprising:
   assigning lot subtypes to lots in the production facility, one of the lot subtypes comprising a designator operable for distinguishing lots selected for expedited handling;
   upon entering a production queue, identifying a lot having the designator, the lot awaiting at least one process;
   responsive to the identifying, sending an inhibit signal to a machine, the inhibit signal operable for preventing dispatch of a lot in the production queue that is next in line for the machine and which does not have the designator; and
   in response to receiving a signal that the machine is available, sending a signal to the machine for binding the machine to the lot having the designator.

2. The method of claim 1, wherein the machine is available when a current work in process has been completed by the machine.

3. The method of claim 1, further comprising:
   receiving a signal from the machine acknowledging the signal binding the lot having the designator to the machine; and
   removing the inhibit signal, the removing operable for enabling the machine, upon completion of processing the lot having the designator, to receive the lot in the production queue that is next in line.

4. The method of claim 1, further comprising:
   assigning an inhibitor rule to the lot having the designator, wherein upon entering the production queue, the lot having the designator is processed in accordance with the inhibitor rule, wherein the processing in accordance with the inhibitor rule includes:
   estimating a time that the lot having the designator will arrive at a machine;
   determining remaining time for lots currently being processed at the machine; and
   selecting a tool that is estimated to be available at or near the estimated time of arrival of the lot having the designator;
   wherein the inhibitor rule is one of:
   first available;
   future processing steps; and
   raw processing time.

5. The method of claim 4, wherein in response to assigning the first available inhibitor rule, inhibit signals are sent sequentially to each machine identified in a route traveled by the lot having the designator.

6. The method of claim 4, wherein in response to assigning the future processing steps inhibitor rule, inhibit signals are sent sequentially to each machine identified in a route that perform processing steps identified in the inhibitor rule, the route traveled by the lot having the designator.

7. The method of claim 4, wherein in response to assigning the raw processing time inhibitor rule, inhibit signals are sent sequentially to each machine identified in a route that perform processing steps which consume an amount of time identified in the inhibitor rule, the route traveled by the lot having the designator.

8. A system for optimizing throughput of lots in a production facility, comprising:
   a production machine; and
   a host system in communication with the production machine, the host system executing a manufacturing execution system and a lot optimization application, the lot optimization application including a user interface for assigning lot subtypes to lots in the production facility, one of the lot subtypes comprising a designator operable for distinguishing lots selected for expedited handling; wherein upon entering a production queue, the lot optimization application performs:
   identifying a lot having the designator, the lot awaiting at least one process by the machine;
   responsive to the identifying, sending an inhibit signal to the machine, the inhibit signal operable for preventing dispatch of a lot in the production queue that is next in line for the machine and which does not have the designator; and
   in response to receiving a signal that the machine is available, sending a signal to the machine for binding the machine to the lot having the designator.

9. The system of claim 8, wherein the machine is available when a current work in process has been completed by the machine.

10. The system of claim 8, wherein the lot optimization application further performs:
    receiving a signal from the machine acknowledging the signal binding the lot having the designator to the machine; and
    removing the inhibit signal, the removing operable for enabling the machine, upon completion of processing the lot having the designator, to receive the lot in the production queue that is next in line.

11. The system of claim 8, wherein the lot optimization application further performs:
    assigning an inhibitor rule to the lot having the designator, wherein upon entering the production queue, the lot having the designator is processed in accordance with the inhibitor rule, wherein the processing in accordance with the inhibitor rule includes:
    estimating a time that the lot having the designator will arrive at a machine;
    determining remaining time for lots currently being processed at the machine; and
    selecting a tool that is estimated to be available at or near the estimated time of arrival of the lot having the designator;
    wherein the inhibitor rule is one of:
    first available;
    future processing steps; and
    raw processing time.

12. The system of claim 11, wherein in response to assigning the first available inhibitor rule, inhibit signals are sent sequentially to each machine identified in a route traveled by the lot having the designator.

13. The system of claim 11, wherein in response to assigning the future processing steps inhibitor rule, inhibit signals are sent sequentially to each machine identified in a route that perform processing steps identified in the inhibitor rule, the route traveled by the lot having the designator.

14. The system of claim 11, wherein in response to assigning the raw processing time inhibitor rule, inhibit signals are sent sequentially to each machine identified in a route that perform processing steps which consume an amount of time identified in the inhibitor rule, the route traveled by the lot having the designator.

15. A computer program product for optimizing throughput of lots in a production facility, the computer program product including instructions for performing a method, comprising:

assigning lot subtypes to lots in the production facility, one of the lot subtypes comprising a designator operable for distinguishing lots selected for expedited handling;

upon entering a production queue, identifying a lot having the designator, the lot awaiting a process;

responsive to the identifying, sending an inhibit signal to a machine, the inhibit signal operable for preventing dispatch of a lot in the production queue that is next in line for the machine and which does not have the designator; and in response to receiving a signal that the machine is available, sending a signal to the machine for binding the machine to the lot having the designator.

16. The computer program product of claim 15, wherein the machine is available when a current work in process has been completed by the machine.

17. The computer program product of claim 15, further comprising instructions for performing:

receiving a signal from the machine acknowledging the signal binding the lot having the designator to the machine; and removing the inhibit signal, the removing operable for enabling the machine, upon completion of processing the lot having the designator, to receive the lot in the production queue that is next in line.

18. The computer program product of claim 15, further comprising instructions for assigning an inhibitor rule to the lot having the designator, wherein upon entering the production queue, the lot having the designator is processed in accordance with the inhibitor rule, wherein the processing in accordance with the inhibitor rule includes:

estimating a time that the lot having the designator will arrive at a machine;

determining remaining time for lots currently being processed at the machine; and selecting a tool that is estimated to be available at or near the estimated time of arrival of the lot having the designator;

wherein the inhibitor rule is one of:

first available;

future processing steps; and raw processing time.

19. The computer program product of claim 18, wherein in response to assigning the first available inhibitor rule, inhibit signals are sent sequentially to each machine identified in a route traveled by the lot having the designator.

20. The computer program product of claim 18, wherein in response to assigning the future processing steps inhibitor rule, inhibit signals are sent sequentially to each machine identified in a route that perform processing steps identified in the inhibitor rule, the route traveled by the lot having the designator.

\* \* \* \* \*